March 24, 1953 — R. C. COBLENTZ — 2,632,315
COMPRESSED AIR SYSTEM HAVING A COOLING MEANS
Filed May 19, 1949 — 3 Sheets-Sheet 1

Inventor
Robert C Coblentz
By Ralph Hammer
Attorney

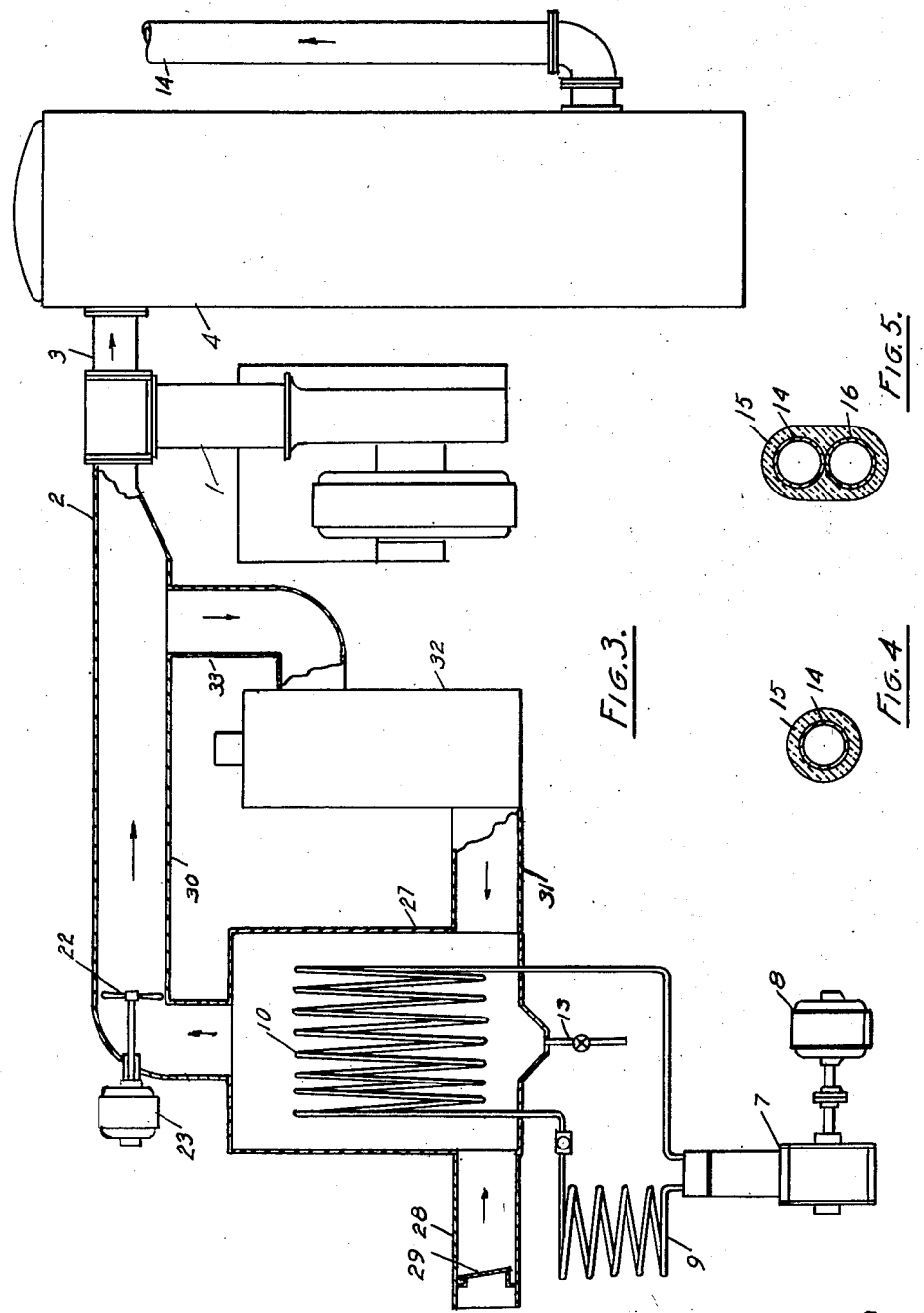

March 24, 1953 R. C. COBLENTZ 2,632,315
COMPRESSED AIR SYSTEM HAVING A COOLING MEANS
Filed May 19, 1949 3 Sheets-Sheet 3

Inventor
Robert C Coblentz
By
Ralph Hammar
Attorney

Patented Mar. 24, 1953

2,632,315

UNITED STATES PATENT OFFICE 2,632,315

COMPRESSED AIR SYSTEM HAVING A COOLING MEANS

Robert C. Coblentz, Erie, Pa.

Application May 19, 1949, Serial No. 94,185

4 Claims. (Cl. 62—140)

This invention is a system for delivering dry compressed air at higher efficiencies than have been heretofore obtainable. The increased efficiency is obtained in part from the cooling of the intake air prior to delivery to the air compressor, and in part from the delivery of the compressed air to the compressed air lines in a heated condition. If necessary, the temperature of the compressed air lines may be maintained by auxiliary heating. Further objects and advantages appear in the specification and claims.

Figure 1:
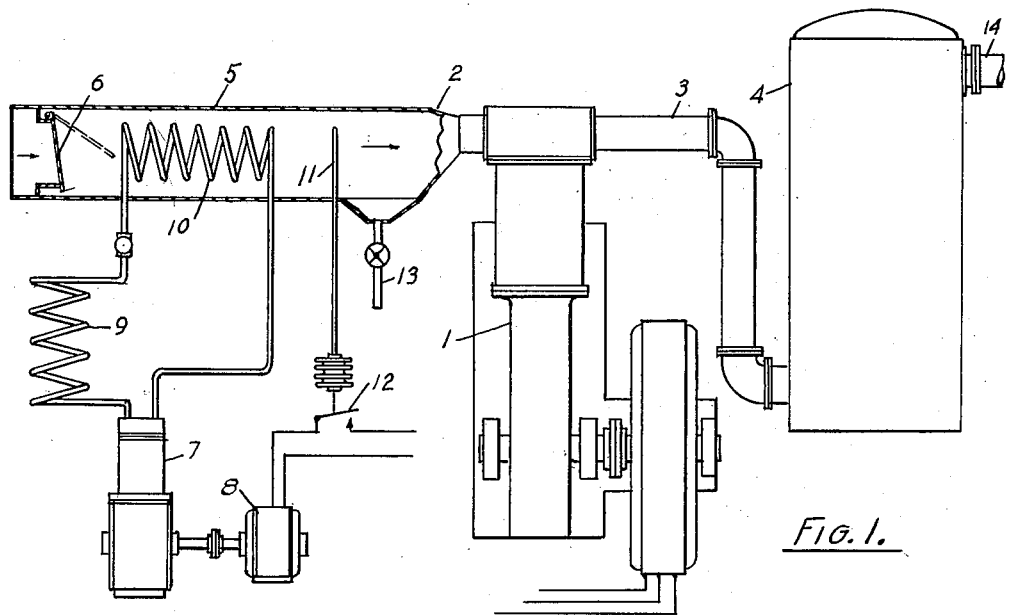
Figure 2:
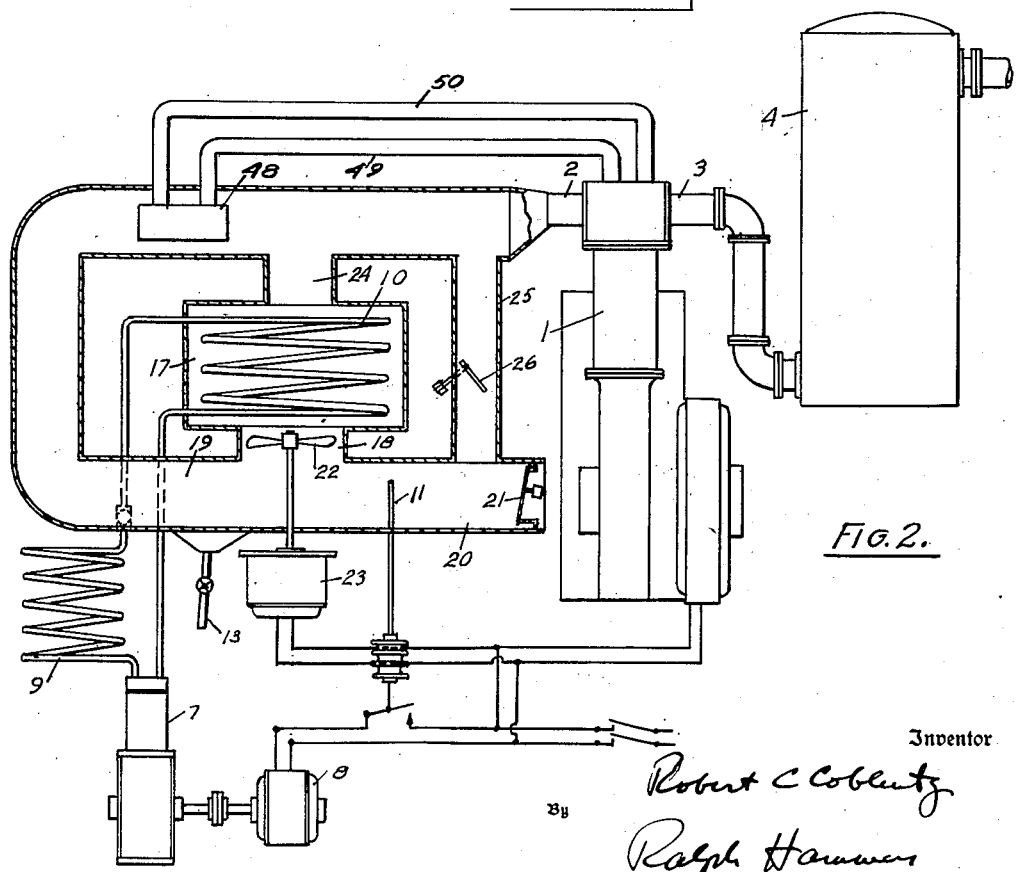
Figure 6:
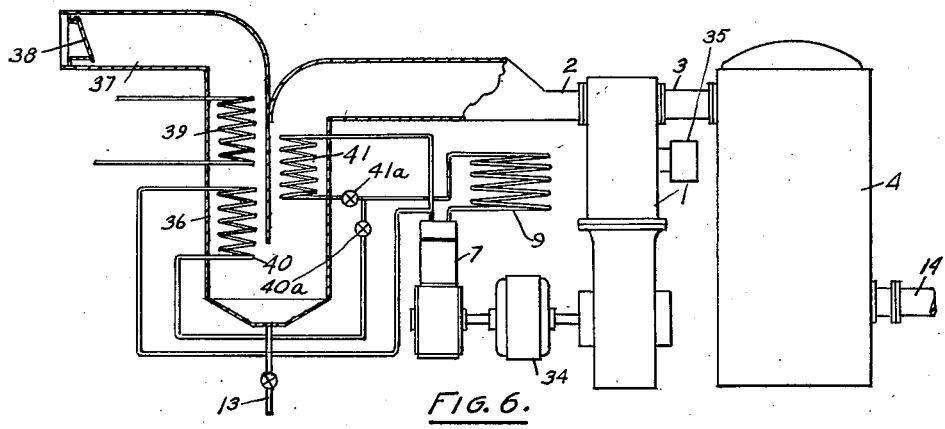
Figure 7:
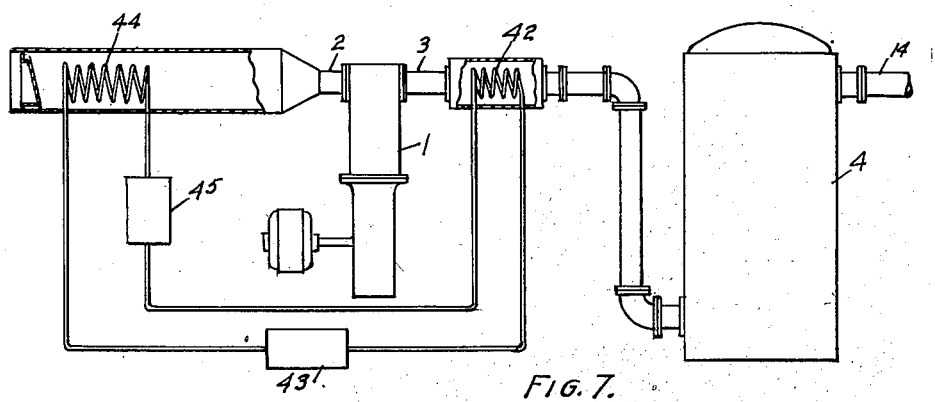
Figure 8:
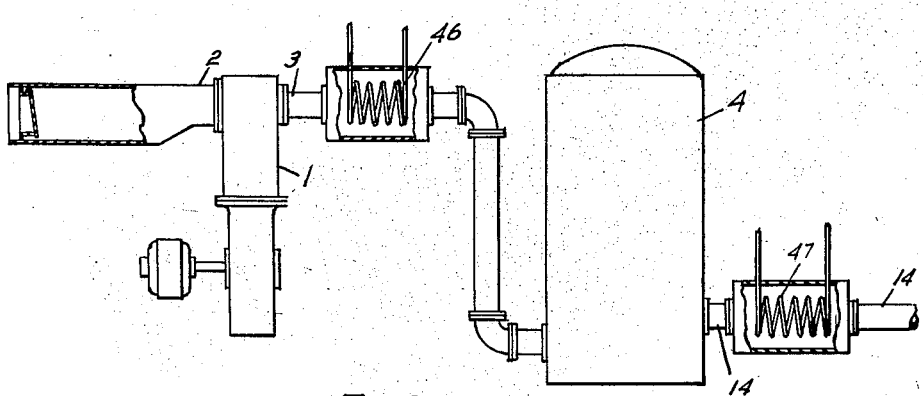

In the accompanying drawings, Fig. 1 is a diagrammatic view of a compressed air installation showing a refrigerating system in the air intake for cooling the inlet air; Fig. 2 is a diagrammatic view of a modification in which the intake air for the compressor is cooled by an air conditioning unit having a fan for delivering air to the compressor intake under pressure; Fig. 3 is a diagrammatic view of a compressed air system having both an air cooler and an air dryer in the compressor intake; Fig. 4 is a section through an insulated compressed air line; Fig. 5 is a section through an insulated and heated compressed air line, both of which are for use with any of the compressed air systems illustrated; Fig. 6 is a diagram of a compressed air system in which all of the drying of the air is accomplished by a two stage refrigeration unit; Fig. 7 is a diagram of a compressed air system in which the intake air is cooled and dried by an absorption refrigeration system heated by the compressed air, and Fig. 8 is a diagram of a compressed air system having an after heater in the compressed air line.

In the drawings, 1 indicates an air compressor having an intake 2 and a discharge 3 leading to a tank 4 which ordinarily would be provided with pressure controls not illustrated. The compressor intake is connected to a duct 5 normally closed by a damper 6 which is opened by the compressor suction. The air in the duct 5 is cooled by a refrigeration system having a compressor 7 driven by a motor 8, a condenser 9 and an evaporator 10. The refrigeration system is controlled by a thermostatic bulb 11 in the downstream section of the duct 5 which closes a switch 12 whenever the temperature of the air within the duct rises above the desired value, for example 40° F. The cooling of the air within the duct 5 results in the condensation of moisture which is drained through a drain line 13. The pre-cooling of the compressor intake air to 40° F. reduces the moisture content to four-tenths of a pound per 1000 cubic feet. If the outside air had a temperature of 90° F. and a saturation of 100%, the pre-cooling to 40° F. would result in the removal of 1.7 pounds of water for each 1000 cubic feet of free air, or in other words, the removal of 81% of the moisture in the air. Another advantage of the pre-cooling of the compressor intake air is the increase in efficiency and capacity of the compressor. The compressor will deliver 1% more compressed air for every five degrees of temperature reduction of the intake air. In the example cited where the compressor intake air is cooled from 90° F. to 40° F. there will be a 10% increase in the compressor output. During the compression the temperature of the air increases. Upon compression to 100 pounds per square inch the temperature of the compressed air delivered to the outlet 3 will be from 250° F. to 500° F. when the intake air is cooled to 40° F. and the discharge pressure is 100 pounds per square inch, so long as the compressed air is kept above 105° F. the air will be dry and it will be impossible to condense any moisture. In installations where the compressor is in steady use the compressed air can be maintained above 105° F. by insulating the tank and compressed air lines. Where the compressor is shut down for appreciable periods of times it may be necessary to provide auxiliary heating. Fig. 4 shows a compressed air line 14 surrounded by an insulating jacket 15. Fig. 5 shows a steam line 16 within the insulating jacket. Either of these expedients may be used to maintain the compressed air line in a heated condition above the ambient. Without such expedients, the compressed air line will normally be at the ambient or room temperature. The delivery of compressed air in a heated condition results in a further increase in the efficiency and capacity of the compressor. The increase in efficiency amounts to as much as 25%. The overall gain in efficiency by pre-cooling the intake air and delivering the compressed air in a heated condition amounts to as much as 35%. Also, the compressed air system is simplified by the elimination of after coolers heretofore considered necessary for the removal of moisture.

Under normal operating conditions each horsepower supplied to the refrigerating unit for pre-cooling the compressor intake air will result in the delivery of compressed air equivalent to the addition of at least three compressor horsepower.

In Fig. 2 is shown a compressed air system having a different arrangement for pre-cooling the air leading to the compressor intake 2. In this arrangement the refrigerator evaporator 10 is located in a chamber 17 having an intake 18 connected to a by-pass duct 19 and to an air intake duct 20. The air intake duct is normally closed by a damper 21 which opens whenever the compressor is in operation. When the compressor is operating, air in substantially equal amounts flows from the by-pass duct 19 and the air intake duct 20 to the duct 18 and is forced over the evaporator coil by a fan 22 driven by a motor 23 which may be connected in parallel with both the refrigerator and compressor motors so that the fan will run whenever the refrigerator or air compressor are running. Because air in the intake 18 is a mixture of equal parts of air from the by-pass duct 19 and the outside air intake duct 20, the temperature of the air in the intake 18 will be half way between the temperature of the outside air and the temperature of the air in the by-pass duct 19. In flowing over the evaporator 10 the air is cooled to the desired value for the compressor air intake. At the discharge 24 from the chamber 17 the air again divides in approximately equal parts, half going to the compressor air intake 2 and the other half to the by-pass duct 19. When the compressor shuts down the air which would normally flow to the compressor intake 2, flows back to the air intake duct 20 through a by-pass duct 25 normally closed by a damper 26. This results in the flow of cold air into the intake duct 20 which is now closed to the outside air by the damper 21, and as soon as the air in the intake duct 20 reaches the same temperature as the air in the compressor intake 2, the thermostatic bulb 11 shuts off both the refrigerator 3 and the fan motor 23. The fan motor 23 may be separately controlled so it will run continuously.

The system described in Fig. 2 has the additional advantage that the air is delivered to the compressor intake under pressure. This supercharging still further improves the efficiency of the compressor. In other respects the operation is substantially the same as the system shown in Fig. 1. The refrigerator unit for pre-cooling the compressor intake air is a standard air conditioning unit which is readily available on the market.

In Fig. 3 is shown a system in which the compressor intake air is both cooled and dried. In this system the refrigerator evaporator 10 is located in a chamber 27 having a duct 28 leading to the outside air and normally closed by a damper 29; a duct 30 leading to the compressor intake 2 and a duct 31 leading from a dryer 32. The dryer is fed by a by-pass duct 33 branching from the compressor intake duct 30. The fan 22 is suitably located, for example, the compressor intake duct 30 to deliver cooled air to the compressor intake and also to cause a bypassing of part of the cooled air in the compressor intake duct 30 through the dryer and duct 31 back to the chamber 27. As in the previously described systems the cooling of the air within the chamber 27 removes a great deal of the moisture in the incoming air and also pre-cools the air before delivery to the air compressor. In order to avoid frosting of the refrigerator evaporator 10 it is preferable that the pre-cooling be slightly above freezing. At this temperature there may still be enough moisture in the air to cause condensation in the compressed air lines if the temperature of the compressed air lines drops below 105° F. While it is preferable that the temperature of the compressed air lines be maintained, either by insulation as shown in Fig. 4, or by auxiliary heating as shown in Fig. 5, this is not practical in all installations. For installations where the temperature of the compressed air lines cannot be maintained above 105° F., it is necessary that the amount of moisture in the intake to the compressor be that corresponding to air temperatures below 32° F. The use of the dryer 32 permits the removal of the additional moisture so that the compressed air will be dry even though the temperature of the compressed air lines drops.

If the dryer 32 is of the absorption type, such as silica gel or activated alumina, the efficiency of drying is increased by supplying the dryer with pre-cooled air. This contributes to the overall efficiency of the system.

In the compressed air system shown in Fig. 6 a single motor 34 is used to drive both the air compressor 1 and the refrigerant compressor 7. The air compressor is controlled by an unloader 35 diagrammatically indicated. The motor 34 will accordingly run whenever the system calls for compressed air or refrigeration for cooling the compressor air intake. Because of the saving in power resulting from the cooling of the compressor air intake, the motor 34 will be smaller than the usual motor required to run the air compressor alone.

The compressor air intake duct is connected to a chamber 36 fed by an air intake duct 37 normally closed by a damper 38. The drain 13 for water is shown in the lower part of the chamber. Whenever the compressor calls for air, air from the outside is drawn in through the duct 37 over a water cooling coil 39 and a refrigerator evaporator 40. The water coil 39 may be omitted. The evaporator 40 cools the air down to slightly above freezing thereby causing the condensation of the greater part of the moisture in the air which is deposited in the bottom of the chamber 36. After passing the evaporator 40 the air has very little moisture remaining. This additional moisture is, to a great extent, removed by a low temperature evaporator 41 arranged between the evaporator 40 and the compressor intake. The low temperature evaporator 41 drops the compressor air intake temperature down to approximately 0° F., thereby removing enough moisture so that there will be substantially no danger of moisture condensation in the compressed air lines. No attempt has been made to show the controls for the refrigerator or compressor. The compressor can, of course, have the usual pressure controls, and the refrigerator can have the usual temperature and defrosting controls.

In Fig. 7 is shown a compressed air system in which the compressor intake air is cooled by an absorption refrigeration system energized by the heat of compression. As in the previously described systems, the compressor is indicated by the reference numeral 1, the compressor air intake by the numeral 2, the compressor discharge by the numeral 3, and the compressed air tank by the numeral 4. In the compressor discharge 3 is diagrammatically indicated a generator 42 for an absorption refrigeration system and which includes a condenser 43, an evaporator 44, and an absorber 45. The temperature of the air in the compressor discharge will be from 250° F. to 500° F. and can easily be at the higher value. The heat of compression in the compressor outlet 3 which is normally removed by an after cooler, is utilized to energize the absorption refrigerator generator 42 and to thereby supply refrigeration to the evaporator 44 in the compressor air intake. In case the heat of compression does not supply sufficient energy for cooling the intake air, it is obvious that the generator 42 may be supplied with supplemental heat.

In the system shown in Fig. 8 the air intake to the compressor is not cooled and instead the moisture in the compressed air is removed by an after cooler 46 in the compressor discharge line 3. The after cooler removes the moisture, but it also results in substantially a 25% decrease in the volume of compressed air. In order to overcome this decrease a heater 47 is supplied in the compressed air line 14 which may be either insulated, or insulated and heated as shown in Figs. 4 and 5. The heater 47 raises the temperature of the compressed air and partially compensates for the decrease in volume caused by the after cooler.

In the compressed air systems of Figs. 2 and 3 where there is a recirculation of part of the cooled air, the efficiency of moisture removal is increased. That is, at the cooled temperature, the air is not saturated but may have a relative humidity of from 50-60%. Air at 50% relative humidity and 40° F. is dry enough so that at a line pressure of 100 lbs. per square inch it is impossible to condense moisture in the compressed air lines at room temperature. If the compressor intake air is at 40° F. and saturated, and the compressed air line is at 100 lbs. per square inch, moisture will condense whenever the temperature of the compressed air line drops below 105° F. The recirculating or by-pass type of precooler for the compressor air intake is better adapted to compressed air systems when it is not practical to cool the intake air to a low enough temperature to effect all of the desired moisture removal before compression. The recirculating feature can be added to the other systems.

A further advantage of the recirculating precoolers is that the fan for recirculating the air also delivers the air to the compressor intake under pressure and in effect supercharges the compressor. The supercharging alone is important since the capacity of the compressor drops off with decrease in the density of the air. Supercharging in effect increases the density of the air delivered to the compressor cylinder on the suction stroke. Instead of the present practice of using larger compressors at high altitudes, the supercharging permits the use of the same size compressor as at sea level.

The refrigerator or air conditioning precooling units will ordinarily, or can, be supplied with dust filters and fans for forced circulation of air over the evaporator. The dust filters are less susceptible to clogging than the filters customarily used on air compressors. This means that the differential in efficiency resulting from the supercharging will be greater under normal operating conditions than would be expected.

The supercharging and precooling of the compressor intake air increase the capacity of the compressor without increasing the power input. The precooling removes moisture more efficiently than the after cooler. The maintaining of the compressed air line temperature prevents shrinkage of the air. A line temperature of 170° F. results in 25% more compressed air as compared to a line temperature of 70° F.

The supercharging of the air before cooling increases the effectiveness of the moisture removal. For example, air at 30° F. supercharged to a pressure of 10 pounds per square inch is equivalent to air at 15° F., at atmospheric pressure. The supercharging of the compressor air intake before cooling accordingly results in a greater removal of moisture. Where the compressed air system uses a multi-stage air compressor, the substitution of a refrigerator evaporator for the intercooler between the stages will result in an increase in efficiency and in the removal of enough moisture so that the compressed air will be dry under all conditions. The use of a refrigerator evaporator as an inter-cooler also further increases the capacity of the compressor without increasing the power required for operation. It is not believed necessary to illustrate the multi-stage compressors since the construction of such compressors with the inter-stage coolers is well known.

A convenient arrangement for utilizing the refrigerator evaporator for cooling the compressed air between stages is to locate the inter-cooler 48 in the by-pass duct 19 of the Fig. 2 system. The inter-cooler in this case will be an air-to-air heat exchanger. The compressed air will flow from the first stage of the compressor through line 49 to the inter-cooler and from the inter-cooler through line 50 to the second stage of the compressor. This will result in the cooling of the inter-stage compressed air to approximately the same value as the compressor intake air. The inter-cooler will of course be provided with the usual trap for removing the separated water. By the use of refrigerated pre-cooling and inter-cooling, sufficient moisture can be removed so that the compressed air will be dry under all conditions.

What I claim as new is:

1. In a compressed air system, an air compressor, a compressor air intake duct, a chamber having an air intake and a discharge to the compressor intake duct, a refrigerator evaporator in the chamber between its air intake and discharge for cooling the air to the compressor intake duct, a fan creating a suction on the intake side of the evaporator and a pressure on the discharge side of the evaporator, and a by-pass duct from the chamber discharge on the downstream or pressure side of the evaporator to the chamber intake on the upstream or suction side of the evaporator for recirculating part of the cooled air over the evaporator.

2. In a compressed air system, an air compressor, a compressor air intake duct, a refrigerator evaporator for cooling the air flowing into the duct, a fan for creating a suction on the upstream side of the evaporator and a pressure on the downstream side of the evaporator, a drier, and a by-pass from the downstream to the upstream side of the evaporator for recirculating part of the cooled air from the compressor intake duct through the drier and over the evaporator to remove residual moisture in the cooled air.

3. In a compressed air system, an air compressor having an air intake duct, a duct from the outside air cooled by a refrigerator evaporator and discharging into the compressor air intake duct, a fan forcing air through the duct from the outside air to the compressor intake duct under pressure, and a by-pass from the compressor air intake duct to the duct from the outside air on the suction side of the fan for recirculating part of the cooled air.

4. In an air cooling system, a delivery duct for the cooled air, a chamber having an air intake for air to be cooled and a discharge for cooled air to the delivery duct, a refrigerator evaporator in the chamber between its intake and discharge for cooling the air to the delivery duct, a by-pass duct having one end connected to the chamber discharge on the downstream side of the evaporator and the other end connected to the chamber intake on the upstream side of the evaporator, means for causing the flow of air from the chamber intake over the evaporator to the chamber discharge, said means including a fan creating a pressure differential across the by-pass duct in the direction to cause flow through the by-pass duct from the discharge back to the intake for recirculating part of the cooled air over the evaporator.

ROBERT C. COBLENTZ.

REFERENCES CITED

The following references are of record in the file of this patent:

UNITED STATES PATENTS

| Number | Name | Date |
| --- | --- | --- |
| 953,525 | Gayley | Mar. 29, 1910 |
| 2,208,443 | Ashley | July 16, 1940 |
| 2,438,120 | Freygang | Mar. 23, 1948 |